(12) United States Patent
Wu

(10) Patent No.: US 12,089,044 B2
(45) Date of Patent: Sep. 10, 2024

(54) CONTENT SERVICE ACCESSIBILITY FOR UNAUTHENTICATED USERS

(71) Applicant: Charter Communications Operating, LLC, St. Louis, MO (US)

(72) Inventor: Deh-Min Richard Wu, Centennial, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 506 days.

(21) Appl. No.: 17/506,018

(22) Filed: Oct. 20, 2021

(65) Prior Publication Data
US 2023/0125058 A1   Apr. 20, 2023

(51) Int. Cl.
H04W 12/03   (2021.01)
H04L 12/46   (2006.01)
H04W 12/086  (2021.01)

(52) U.S. Cl.
CPC ....... H04W 12/086 (2021.01); H04L 12/4641 (2013.01); H04W 12/03 (2021.01)

(58) Field of Classification Search
CPC .................................................. H04W 12/086
USPC ....................................................... 455/411
See application file for complete search history.

(56) References Cited

U.S. PATENT DOCUMENTS

2009/0019501 A1* 1/2009 Saxena .............. H04N 21/2347
                                                       725/104
2015/0373688 A1* 12/2015 Samuel Raj .......... H04L 63/108
                                                       370/329
2016/0269493 A1* 9/2016 Nasielski ............... H04L 67/51
2019/0028941 A1* 1/2019 Zee .................... H04W 36/0066
2019/0364616 A1* 11/2019 Mishra ................... H04W 88/16
2020/0059784 A1* 2/2020 Batra ..................... H04L 9/3271
2020/0084202 A1* 3/2020 Smith ................... H04W 12/08

FOREIGN PATENT DOCUMENTS

WO      2000067470 A1    11/2000

OTHER PUBLICATIONS

3GPP Technical Specification 23.501 V16.6.0 (Sep. 2020), "System architecture for the 5G System (5GS)" (2020): 447 pages.
3GPP Technical Specification 33.501 V15.6.0 (Sep. 2019), "Security architecture and procedures for 5G system." (2019): 190 pages.

(Continued)

Primary Examiner — Qutbuddin Ghulamali
(74) Attorney, Agent, or Firm — Mendelsohn Dunleavy, P.C.; Steve Mendelsohn

(57) ABSTRACT

Based on a service agreement between a first wireless network provider and a content provider, a user, who subscribes to a second wireless network provider that does not have a roaming agreement with the first wireless network provider, can use an unauthenticated wireless device to receive content from a content system of the content provider via a wireless network of the first wireless network provider. In certain embodiments, the unauthenticated wireless device communicates with an orchestration node of the wireless network using encapsulated messages transmitted via a logical tunnel that bypass nodes of the wireless network that would otherwise prevent a network connection from being established between the unauthenticated wireless device and the wireless network.

16 Claims, 11 Drawing Sheets

(56) References Cited

OTHER PUBLICATIONS

3GPP Technical Report 33.815 V16.0.0 (Sep. 2019), "Study on Security Aspects of Provision of Access to Restricted Local Operator Services by Unauthenticated UEs (PARLOS)." (2019): 16 pages.
OpenAPI Initiative, "OpenAPI Specification v3.1.0" retrieved from <https://spec.openapis.org/oas/v3.1.0> Published Feb. 15, 2021, (2021): 108 pages.
Cablelabs, "5G Wireless Wireline Converged Core Architecture Technical Report." document ID WR-TR-5WWC-ARCH-V03-200618, published Jun. 18, 20 (2020): 53 pages.

\* cited by examiner

FIG. 8    300

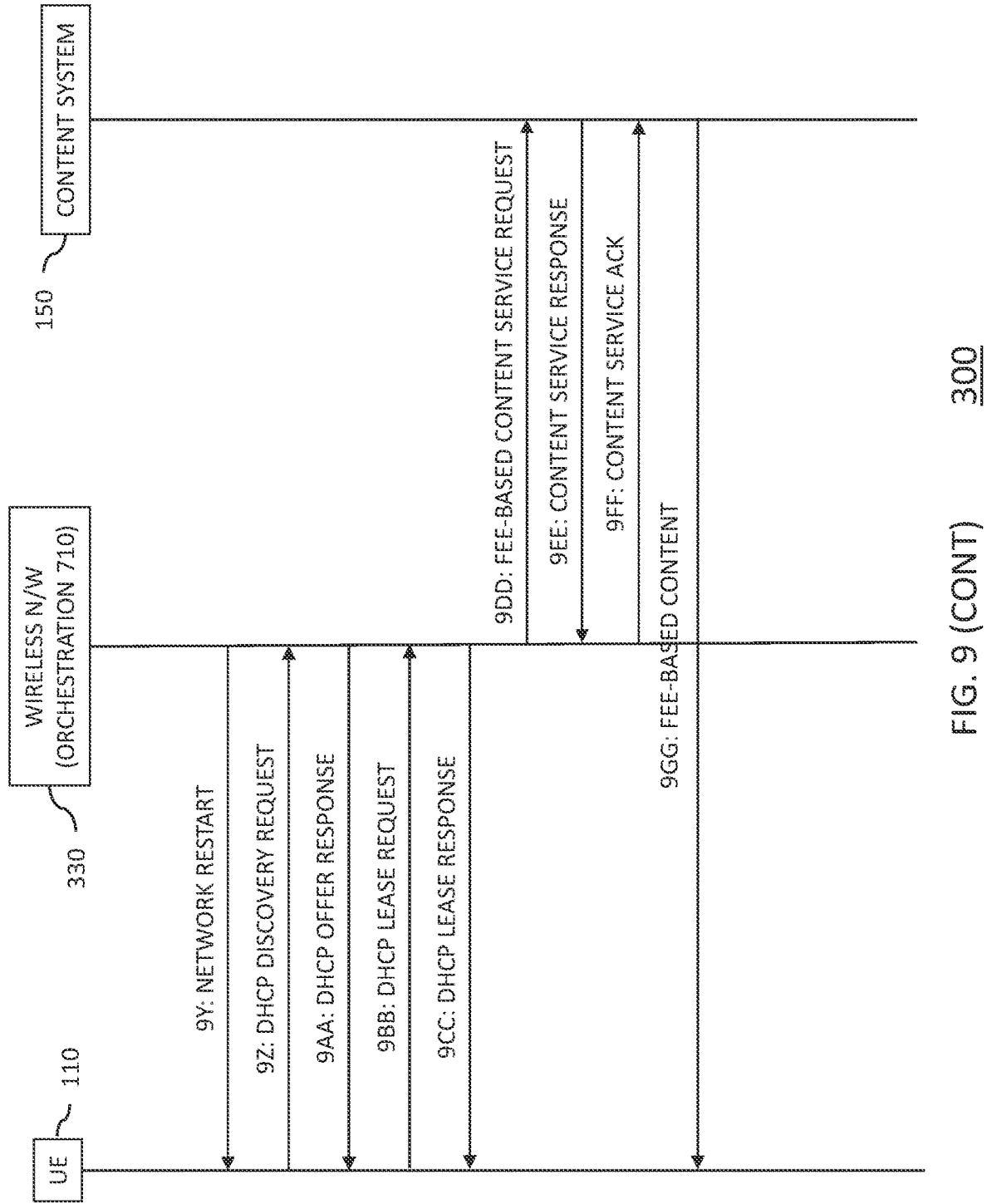

CONTENT SERVICE ACCESSIBILITY FOR UNAUTHENTICATED USERS

BACKGROUND

Field of the Disclosure

The present disclosure relates to wireless communications and, more specifically but not exclusively, to the provision of content services, such as video streaming, to wireless devices.

Description of the Related Art

This section introduces aspects that may help facilitate a better understanding of the disclosure. Accordingly, the statements of this section are to be read in this light and are not to be understood as admissions about what is prior art or what is not prior art.

It is known for a single company to provide both wireless network service and content service to their subscribers, where the term "wireless network service" refers to the company enabling subscribing users to communicate using wireless devices, such as cell phones, and the term "content service" refers to the company providing to its subscribing users, for example, video streaming to their wireless devices. In some situations, a user may subscribe to both of the company's services or to only one of the two services.

In a first possible scenario, a user (User 1) is a subscriber to both wireless network service and content service from Company A. As such, when User 1 is at a location in which wireless network service is provided by Company A, such as User 1's home, User 1 can use their wireless device to access content from Company A. In this case, Company A is providing both access to Company A's wireless network and access to Company A's content. If, however, User 1 is at a location in which wireless network service is not provided by Company A, but is instead provided by a different company (Company B) to which User 1 is not a subscriber and where Company A and Company B do not have a roaming agreement that would allow each company's customers access to the other company's wireless network, then User 1 will not have access to Company B's wireless network and will not be able to use their wireless device to access content from Company A, even though User 1 is a subscriber to Company A's content service.

In a second possible scenario, a different user (User 2) is a subscriber to Company B's wireless network service and to Company A's content service. As such, when User 2 is at a location in which wireless network service is provided by Company B, such as User 2's home, User 2 can use their wireless device to access content from Company A. In this case, Company B is providing access to the wireless network and Company A is providing access to the content. If, however, User 2 is at a location in which wireless network service is provided by Company A and not by Company B, then, without a roaming agreement between Companies A and B, User 2 will not have access to Company A's wireless network and will not be able to use their wireless device to access content from Company A, even though User 2 is a subscriber to Company A's content service.

In a third possible scenario, another user (User 3) is a subscriber to Company C's wireless network service, but is not a subscriber to Company A's content service. As such, when User 3 is at a location in which wireless network service is provided by Company C, such as User 3's home, User 3 can use their wireless device to access the wireless network. In this case, User 3 may be able to use their wireless device to purchase content on an ad hoc basis from Company A, even though User 3 is not a subscriber to Company A's content service. If, however, User 3 is at a location in which wireless network service is provided by Company B, but not Company C, then, without a roaming agreement between Companies B and C, User 3 will not have access to Company B's wireless network and will not be able to purchase content from Company A even on an ad hoc basis.

SUMMARY

Problems in the prior art are addressed in accordance with the principles of the present disclosure by enabling a user who is a subscriber to a company's content service to use their wireless device to have at least limited access to content from that company when the user is at a location in which wireless network service is provided by the same or a different company to whose wireless network service the user is not a subscriber.

For example, in the first possible scenario described above in which User 1 is a subscriber to both wireless network service and content service from Company A, but User 1 is at a location in which wireless network service is provided by Company B to which User 1 is not a subscriber, nevertheless, according to certain embodiments of the present disclosure, Company B will provide User 1 with limited access to Company B's wireless network to use their wireless device to access content from Company A.

In the second possible scenario described above in which User 2 is a subscriber to Company B's wireless network service and to Company A's content service, but User 2 is at a location in which wireless network service is provided by Company A to which User 2 is not a subscriber, nevertheless, according to certain embodiments of the disclosure, Company A will provide User 2 with limited access to Company A's wireless network to use their wireless device to access content from Company A.

In the third possible scenario described above in which User 3 is a subscriber to Company C's wireless network service, but User 3 is not a subscriber to Company A's content service and User 3 is at a location in which wireless network service is provided by Company B to which User 3 is not a subscriber, nevertheless, according to certain embodiments of the disclosure, Company B will provide User 3 with limited access to Company B's wireless network to use their wireless device to purchase content from Company A on an ad hoc basis even though User 3 is not a subscriber to Company A's content service.

According to certain embodiments of the disclosure, in each of these situations, the ability of the user to access Company A's content service is based on a service agreement between Company A and the company that provides wireless network service at the user's current location, where the service agreement enables the user to use their unauthenticated wireless device to gain access to the company's wireless network for the limited purpose of accessing content from Company A even though the user is not a subscriber to that company's wireless network service. Note that, depending on the situation, the company that operates that wireless network may be Company A or a different company.

BRIEF DESCRIPTION OF THE DRAWINGS

Embodiments of the disclosure will become more fully apparent from the following detailed description, the appended claims, and the accompanying drawings in which like reference numerals identify similar or identical elements.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
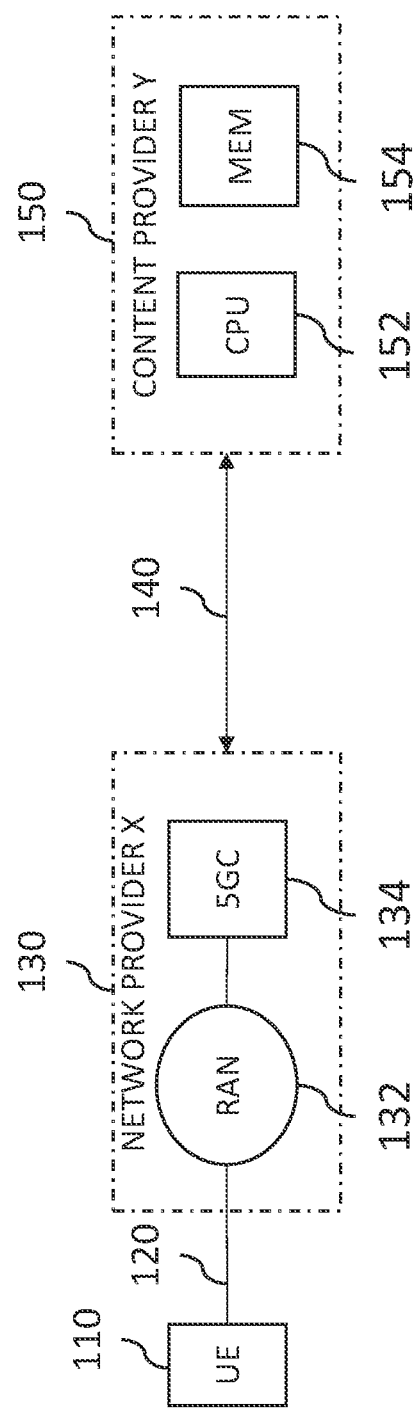
FIG. 1 is a simplified block diagram of a prior-art configuration 100 in which a user is at a location supported by the user's wireless network provider (Network Provider X), where the user is a subscriber to the content service of a content provider (Content Provider Y)

FIG. 1 is a simplified block diagram of a prior-art configuration 100 in which a user is at a location supported by the user's wireless network provider (Network Provider X), where the user is a subscriber to the content service of a content provider (Content Provider Y), where Network Provider X and Content Provider Y may be the same company or two different companies. In that case, the user can use their authenticated wireless device (aka user equipment or UE, for short) 110 to communicate via wireless link 120 with the wireless network 130 of Network Provider X to access content from the content system 150 of Content Provider Y via (wired or wireless) link 140. As shown in FIG. 1, in this particular implementation, the wireless network 130 is a 5G network that includes radio access network (RAN) 132 and 5G core (5GC) 134, while the content system 150 includes processor (CPU) 152 running a content app stored in memory 154.

Figure 2:
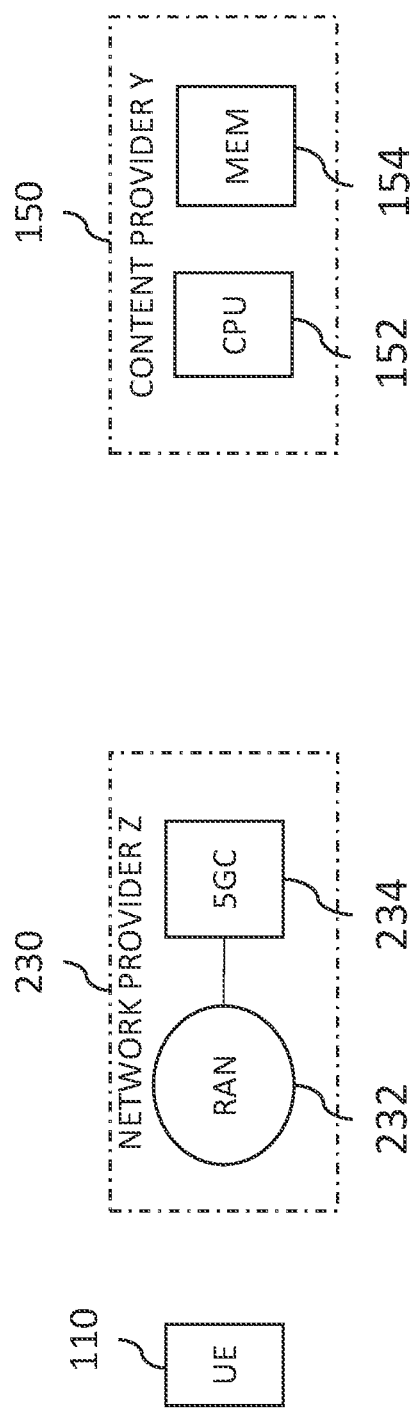
FIG. 2 is a simplified block diagram of a prior-art configuration 200 in which the user of FIG. 1 is at a location supported by a wireless network provider (Network Provider Z) to which the user is not a subscriber, where the user's network provider (Network Provider X of FIG. 1) and Network Provider Z do not have a roaming agreement between them.

FIG. 2 is a simplified block diagram of a prior-art configuration 200 in which the user of FIG. 1 is at a location supported by a wireless network provider (Network Provider Z) to which the user is not a subscriber, where the user's network provider (Network Provider X of FIG. 1) and Network Provider Z do not have a roaming agreement between them. In that case, the user cannot use their unauthenticated UE 110 to communicate with the wireless network 230 of Network Provider Z in order to access content from the content system 150 of Content Provider Y even though the user is a subscriber to Content Provider Y's content service. As shown in FIG. 2, in this particular implementation, the wireless network 230 of Network Provider Z is also a 5G network that includes RAN 232 and 5GC 234.

Figure 3:
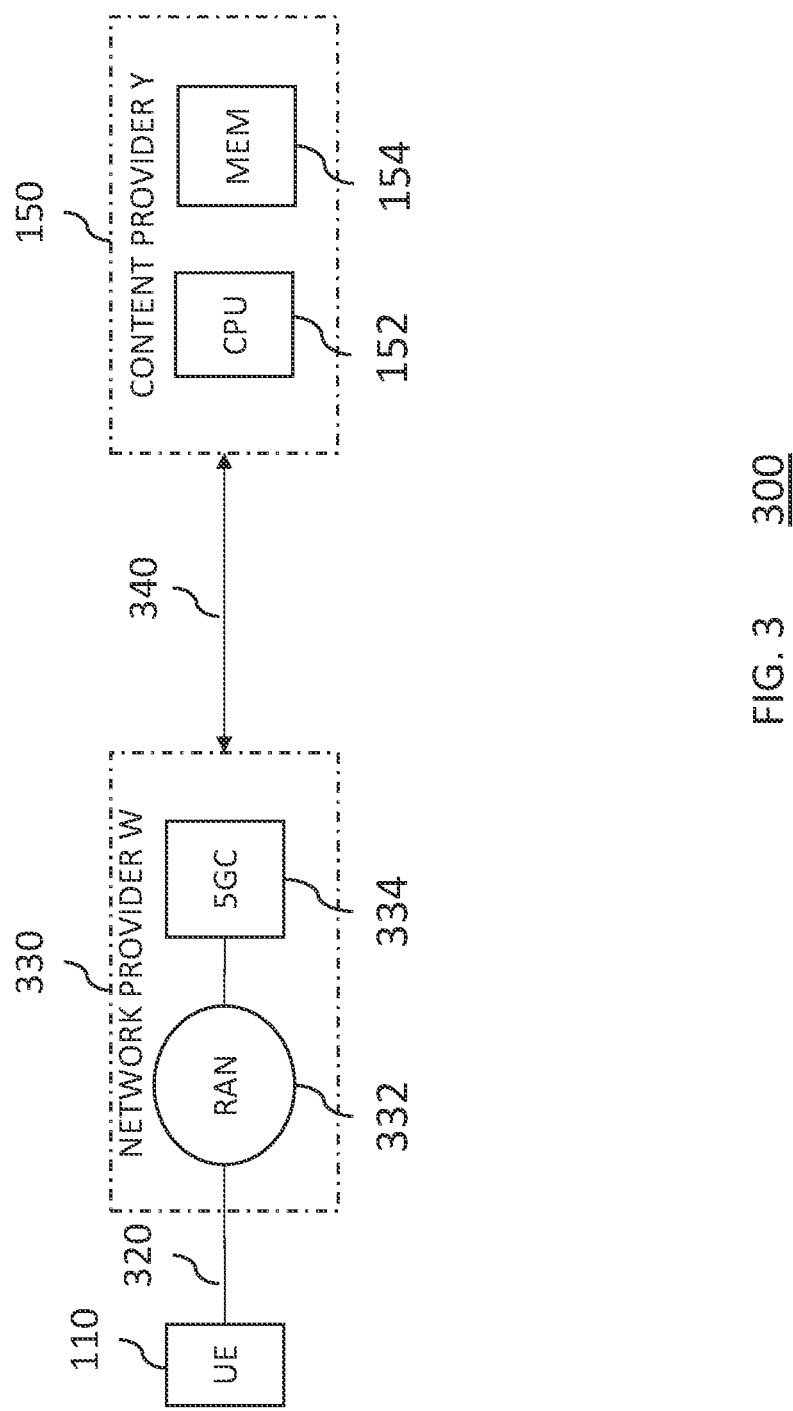
FIG. 3 is a simplified block diagram of a configuration 300 according to an embodiment of the present disclosure in which the user of FIG. 1 is at a location supported by Network Provider W to which the user is also not a subscriber, where the user's network provider (Network Provider X of FIG. 1) and Network Provider W do not have a roaming agreement between them, but where Network Provider W has a service agreement with Content Provider Y.

FIG. 3 is a simplified block diagram of a configuration 300 according to an embodiment of the present disclosure in which the user of FIG. 1 is at a location supported by Network Provider W to which the user is also not a subscriber, where the user's network provider (Network Provider X of FIG. A) and Network Provider W do not have a roaming agreement between them. In this case, however, Network Provider W has a service agreement with Content Provider Y that enables the user to use their unauthenticated UE 110 to communicate via wireless link 320 with the wireless network 330 of Network Provider W to access content from the content system 150 of Content Provider Y via (wired or wireless) link 340 even though the user is not a subscriber to the wireless network service of Network Provider W. As shown in FIG. 3, in this particular implementation, the wireless network 330 of Network Provider W is also a 5G network that includes RAN 332 and 5GC 334.

Figure 4:
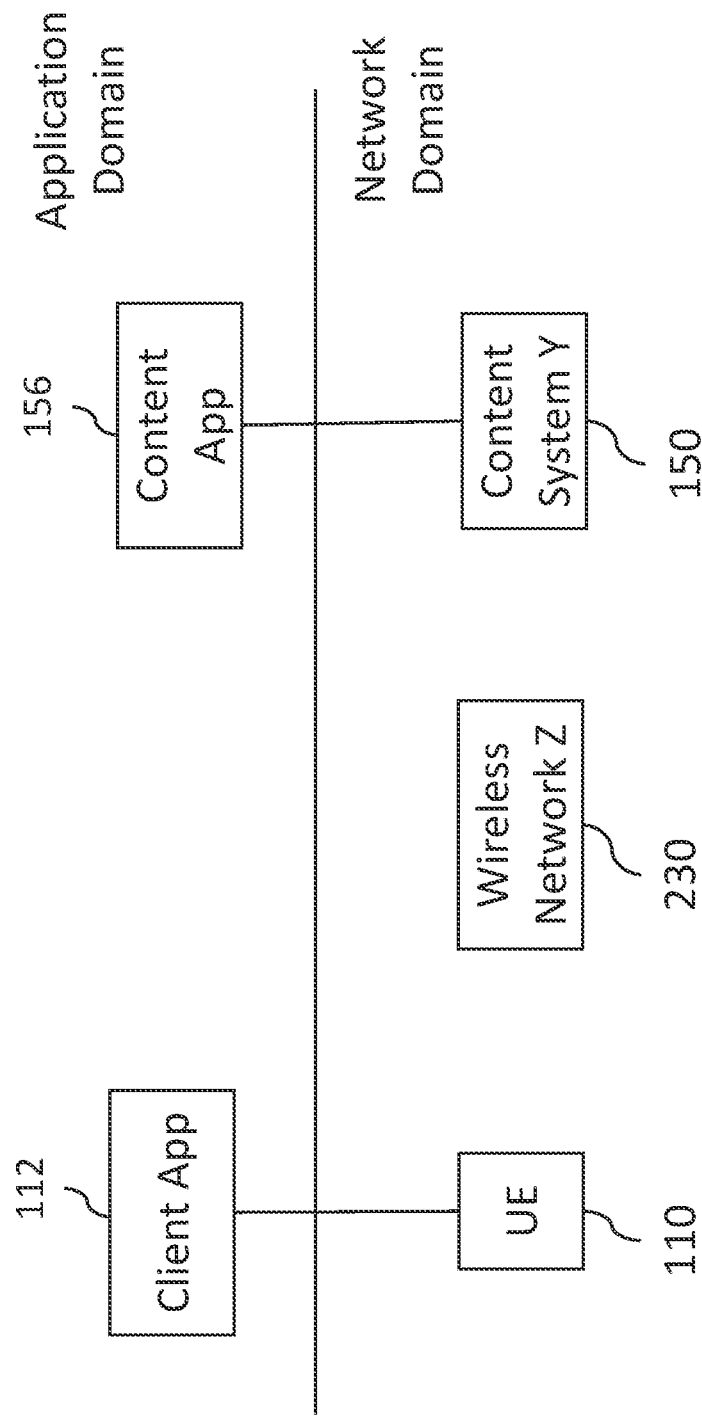
FIG. 4 is a block diagram representing the application and network domains of the prior-art configuration 200 of FIG. 2.

FIG. 4 is a block diagram representing the application and network domains of the prior-art situation 200 of FIG. 2. As represented in FIG. 4, the client app 112 running on the user's unauthenticated UE 110 is not (logically) connected in the application domain with the content app 156 running on the content system 150 of Content Provider Y because the unauthenticated UE 110 has no (physical) wireless connection in the network domain to the wireless network 230 of Network Provider Z due to the absence of both (i) a roaming agreement between the user's wireless network service provider (i.e., Network Provider X) and Network Provider Z and (ii) a service agreement between Network Provider Z and Content Provider Y.

Figure 5:
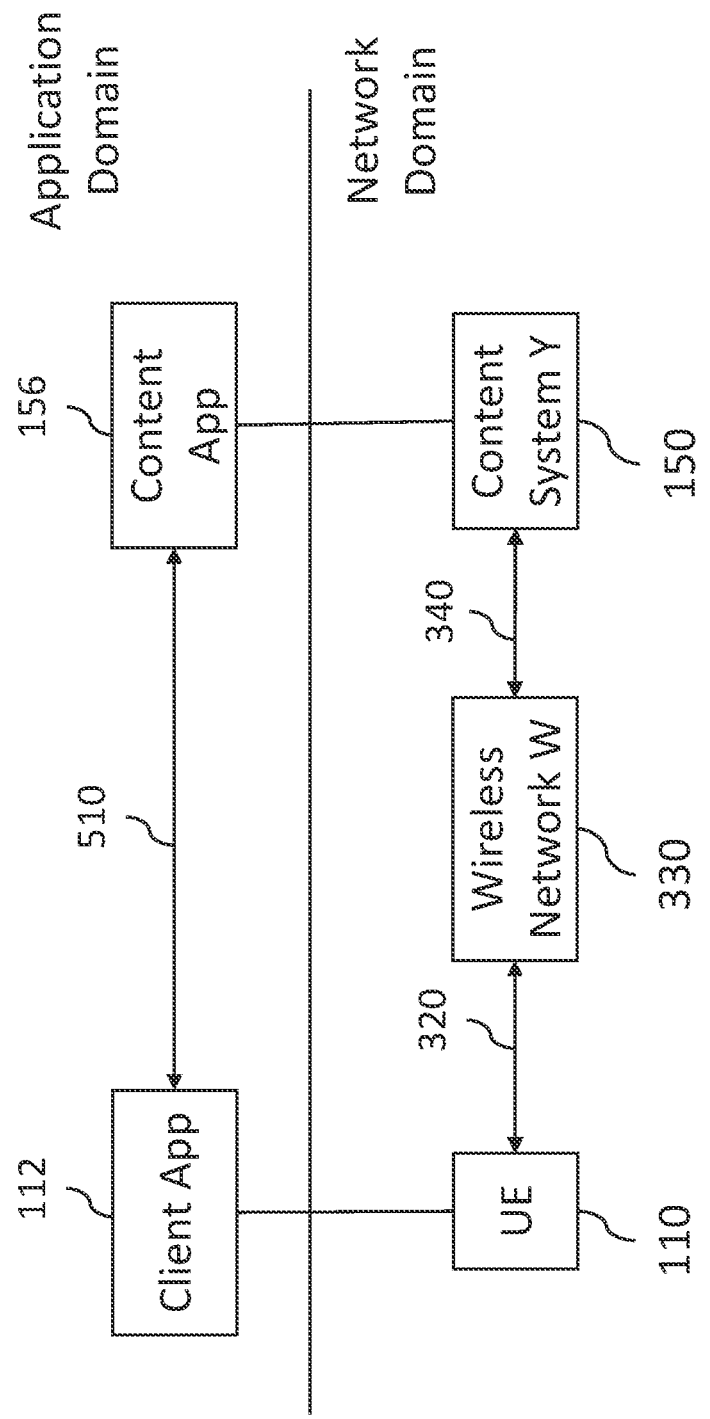
FIG. 5 is a block diagram representing the application and network domains of the configuration 300 of FIG. 3.

FIG. 5 is a block diagram representing the application and network domains of the situation 300 of FIG. 3. As represented in FIG. 5, the client app 112 running on the user's unauthenticated UE 110 does have a (logical) connection 510 in the application domain with the content app 156 running on the content system 150 of Content Provider Y because the unauthenticated UE 110 has the (physical) wireless link 320 in the network domain to the wireless network 330 of Network Provider W, which in turn has the (physical) link 340 with the content system 150 of Content Provider Y due to the service agreement between Network Provider W and Content Provider Y, even in the absence of a roaming agreement between the user's wireless network service provider (i.e., Network Provider X) and Network Provider Z.

Figure 6:
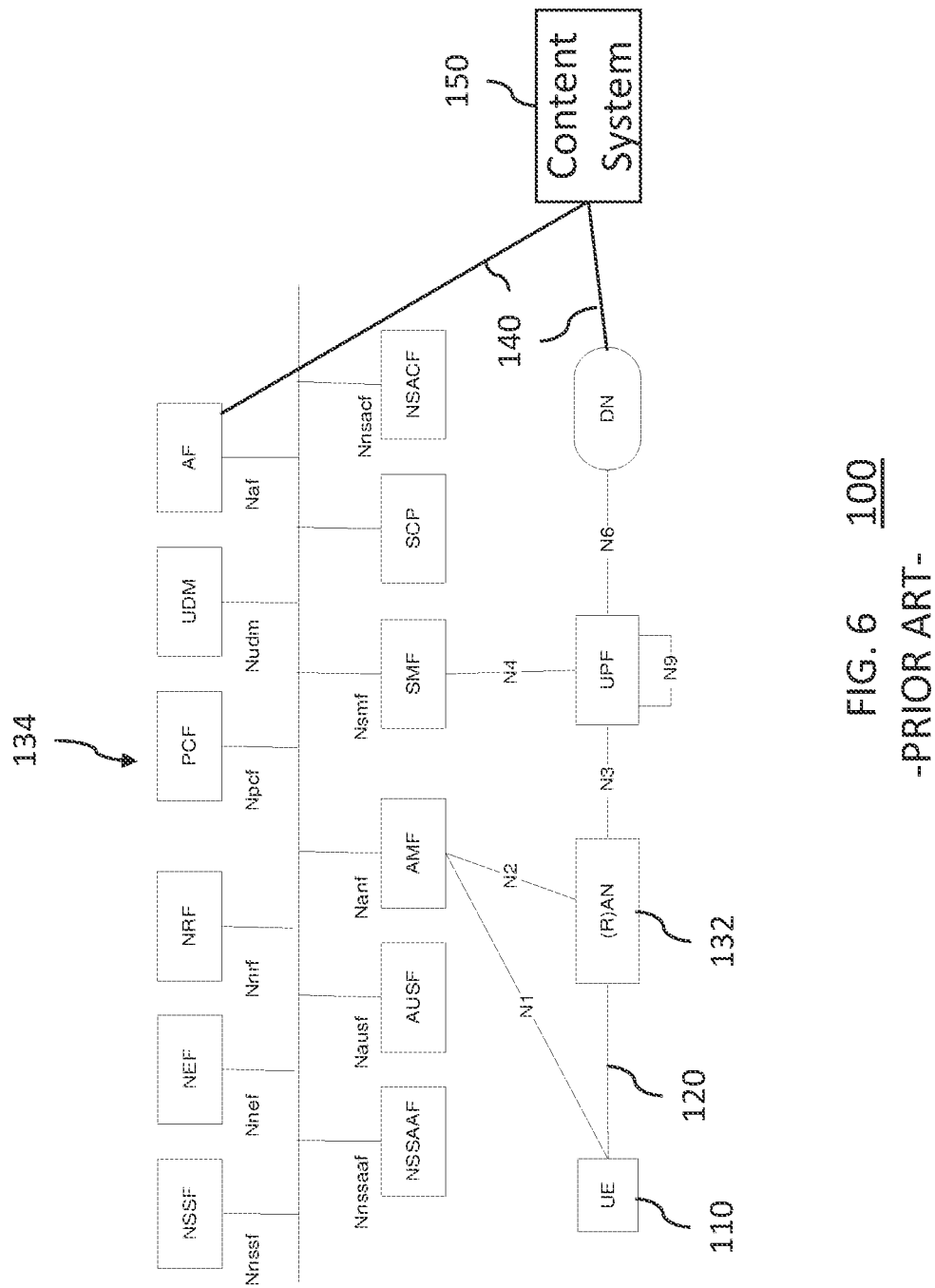
FIG. 6 is a block diagram of a portion of the prior-art configuration 100 of FIG. 1.

FIG. 6 is a block diagram of a portion of the prior-art situation 100 of FIG. 1. FIG. 6 shows the authenticated UE 110 in communication with the RAN 132 of the prior-art wireless network 130 of the user's Network Provider X via wireless link 120. FIG. 6 also represents the conventional elements of the 5GC 134 of the wireless network 130, which conforms to the 5G standard specified in 3GPP 23.501, the teachings of which are incorporated herein by reference in their entirety. As shown in FIG. 6, the content system 150 is connected via link 140 to both the application function (AF) node and the data network (DN) node of the 5GC 134.

Figure 7:
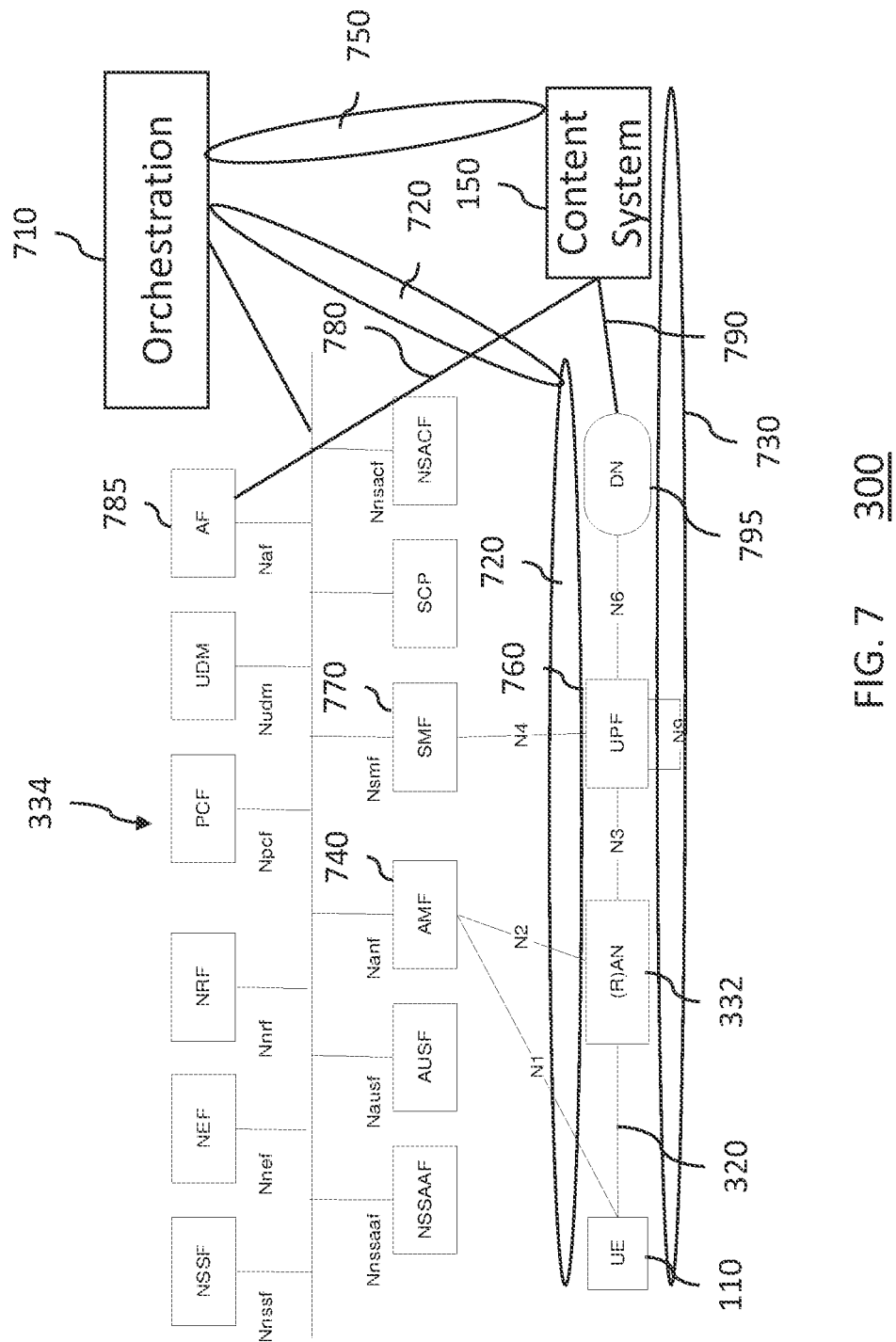
FIG. 7 is a different block diagram of the configuration 300 of FIGS. 3 and 5.

FIG. 7 is a different block diagram of the situation 300 of FIGS. 3 and 5. FIG. 7 shows the unauthenticated UE 110 in communication with the RAN 332 of the wireless network 330 of Network Provider W via wireless link 320. FIG. 7 also represents the elements of the 5GC 334 of the wireless network 330. As shown in FIG. 7, in addition to all of the conventional elements represented in FIG. 6, the 5GC 334 of Network Provider W's wireless network 330 also includes orchestration node 710. As described further below, orchestration node 710 enables the unauthenticated UE 110 to communicate with Network Provider W's RAN 332 via wireless link 320 for the limited purpose of accessing content from the content system 150 of Content Provider Y, even though the user does not subscribe to Network Provider W's wireless network service.

As shown in FIG. 7, the content system 150 communicates (i) via link 780 with the AF node 785 and (ii) via link 790 with the DN node 795, where links 780 and 790 are part of link 340 of FIGS. 3 and 5. As described further below, the content system 150 uses (i) the link 780 to communicate with the orchestration node 710 and (ii) the link 790 to stream content to the UE 110 via DN 795, UPF 760, and RAN 332.

As represented in FIG. 7, the unauthenticated UE 110 initially communicates with the orchestration node 710 in a virtual local area network (VLAN) referred to herein as "the management VLAN 720" to access free content and information about fee-based content available from the content system 150 and to select specific fee-based content to receive. In some implementations, the orchestration node 710 communicates with the content system 150 via link 780 within a dedicated, permanent VLAN 750 that the content system 150 uses to provide the free content (e.g., a catalog of available, fee-based content and free trailers for that fee-based content) that the orchestration node 710 provides to the unauthenticated UE 110. In these implementations, the content system 150 may provide that free content to the orchestration node 710 during off-line operations that may be performed even before management VLAN 720 is established between the unauthenticated UE 110 and the orchestration node 710. In other implementations, the content system 150 is part of the management VLAN 720 such that the content system 150 may provide free content to the orchestration node 710 for the UE 110 via link 780 within the management VLAN 720 during on-line operations with the UE 110. In some implementations, no video streaming is allowed within the management VLAN 720.

After access to the selected fee-based content is approved (e.g., if the user subscribes to the Content Provider Y's content services or after the non-subscribing user pays for the content), the still unauthenticated UE 110 communicates with the content system 150 in a VLAN referred to herein as "the data VLAN 730" to receive that fee-based content through link 790 and via the DN node 795, the UPF node 760, and the RAN 332 without traversing other nodes in the 5GC 334 (including the orchestration node 710). In some implementations, only the data VLAN 730 can support video streaming from the content system 150 to the unauthenticated UE 110.

The management VLAN 720 and the data VLAN 730 have different IP address domains/subnetworks (e.g., the management VLAN 720 with IP address 10.10.100.xxx and the data VLAN 730 with IP address 10.10.200.yyy).

Note that the VLANs 720, 730, and 750 are logic constructs; the signals between the unauthenticated UE 110, the orchestration node 710, and the content system 150 physically flow through the links 320, 780, and 790 and via RAN 332 and other nodes of the 5GC 334, as appropriate.

Based on its service agreement with Content Provider Y, Network Provider W is willing to provide access to its wireless network 330 by the unauthenticated UE 110 for the limited purpose of allowing the user to use the unauthenticated UE 110 to access content from Content Provider Y. This wireless network access is created by Content Provider Y's content system 150 providing Network Provider W's wireless network 330 with the appropriate network configuration. Content Provider Y provides network configurations to Network Provider W based on their service agreement. The configuration can include (without limitation):
  Starting and ending time the service is available;
  Geographic location (e.g., cell coverage within a polygon topology) the content can be provided to a user;
  Information to make a user aware of the available local access (e.g., text about products);
  Information about services to start the content streaming (e.g., server IP address, websites);
  The process to gain and terminate access to the wireless network and the content system (e.g., credentials to access content system 150 as a temporary user); and
  Quality of Service parameters (e.g., bandwidth needed for a service).

The method to provide this configuration from Content Provider Y to Network Provider W can be based on (without limitation):
  A file with these configuration values in JavaScript Object Notation (JSON), Yet Another Markup Language (YAML), Comma-Separated Values (CSV), and/or Extensible Markup Language (XML) format;
  Data Yet Another Next Generation (YANG) model retrieved via operations GET or pushed via POST, PUT; and
  Simple Network Management Protocol (SNMP) Management Information Base (MIB) via SET or GET operations.

When the user of UE 110 is located away from a coverage area of its wireless network provider (i.e., Network Provider X of FIG. 1), the user uses the client app 112 running on the unauthenticated UE 110 to access the content app 156 of Content Provider Y via the wireless network 330 of Network Provider W, even though UE 110 is not authenticated by Network Provider W.

In some implementations, the initial access is free but limited such that the unauthenticated UE 110 can achieve only initial network connectivity to acquire information about the content services available from Content Provider Y, e.g., service catalog, movie trailers, payment information, etc. The user can then use the client app 112 of FIG. 5 to select a particular instance of available fee-based content, e.g., a movie, to be streamed from the content system 150 of Content Provider Y via the wireless network 330 of Network Provider W to the unauthenticated UE 110.

If the user is a subscriber to the content services of Content Provider Y, then, depending on the particular implementation, the user might or might not be charged extra for the selected fee-based content. In some implementations, if the user is not a subscriber to Content Provider Y's content services, then the user is able to purchase fee-based content from Content Provider Y on an ad hoc basis, which might involve the user using the client app 112 to enter credit card or bank account information.

Under the prior art, a network connection between a user's UE and a network provider's wireless network must be established before a content provider is able to provide any content to the authenticated UE, and users who do not have such network access are excluded from accessing that content using their unauthenticated UEs. According to certain embodiments of the present disclosure, however, the orchestration node 710 enables an unauthenticated UE 110 to access content from content system 150 via the wireless network 330 notwithstanding the fact that the user does not subscribe to Network Provider W.

According to embodiments of the disclosure, there are different techniques for establishing a network connection between an unauthenticated UE and a local wireless network in order to enable the unauthenticated UE to access content from a content provider's content system. One technique involves automatic network set up in which an unauthenticated UE starts to search for the wireless network based on the priority list configured on the Universal Subscriber Identity Module (USIM), eSIM, or dual SIM card. The card inside the UE is configured by the UE's home network provider. The home network provider is able to initialize and configure the SIM card with the priority list for the networks with an agreement. Because there is no roaming agreement between the local network provider (e.g., Wireless Provider W of FIG. 3) and the user's network provider (e.g., Wireless Provider X of FIG. 1), the USIM does not have the local wireless provider in the unauthenticated UE's search list Instead, the wireless network broadcasts, to all local UEs via a System Information Block (SIB) channel, network configuration including the following information (without limitation):

Wireless network name and connection configuration (for the management VLAN 720 of FIG. 7);
Credentials to access the wireless network as a temporary user;
Human-readable information about the procedure to gain access to the wireless network;
Human-readable information about the procedure to access the content system (e.g., content system 150 of FIG. 1);
Means for a UE to select and access the wireless network; and
Means for a UE to select and access the content system.

Another technique involves manual network selection in which an unauthenticated UE displays the wireless network set-up information received from the wireless network and allows the user to select the wireless network to access and then select a content service that the wireless network is providing from the content system.

In some embodiments, due to the service agreement between a content provider and a wireless network provider, the network provider provides unauthenticated UEs with limited network access to communicate with the content provider's content system, and the content provider provides unauthenticated UEs with initial (e.g., free) access that allows communication only within the management VLAN 720 of FIG. 7. During UE access within the management VLAN 720, the network connectivity with the orchestration node 710 is used to advertise content services to the user. If the user is a subscriber to the content provider's content service, then the orchestration node 710 moves the user to the data VLAN 730 of FIG. 7 for accessing content from the content system 150. If the user is not a subscriber, then the orchestration node 710 will ask the user to pay for content on an ad hoc basis before moving the user to the data VLAN 730.

Figure 8:
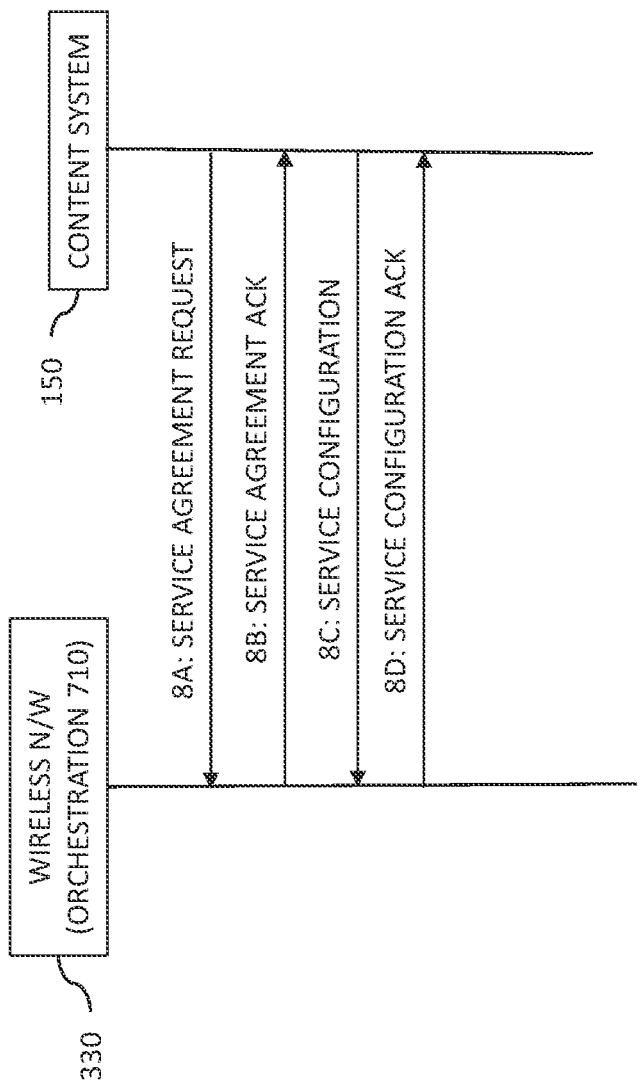
FIG. 8 is a message-flow diagram representing the processing for one possible implementation of the configuration 300 of FIGS. 3, 5, and 7 by which Network Provider W and Content Provider Y establish a service agreement.

FIG. 8 is a message-flow diagram representing the processing within the configuration 300 of FIGS. 3, 5, and 7 by which Network Provider W and Content Provider Y establish a service agreement in which Network Provider W agrees to provide limited access to its wireless network 330 by unauthenticated UEs of users, who are not subscribers to Network Provider W's wireless network services, to receive content from Content Provider Y's content system 150 according to certain implementations of the disclosure.

In step 8A of FIG. 8, Content Provider Y's content system 150 transmits, to the orchestration node 710 of Network Provider W's wireless network 330, a request to establish a service agreement between Content Provider Y and Network Provider W. The service agreement request 8A contains at least the following information:

Service ID: The global unique identification of the service provided by the content provider;
Service Type: The class of the service;
Server IP: The IP address of the content system 150; and
Connection Method: The method for future content provider and network provider communication, e.g., protocol type, version control, data format.

In response, in step 8B, the orchestration node 710 transmits, to the content system 150, a service agreement acknowledgement message (i.e., ACK) agreeing to the service agreement and containing at least the following information:

Service ID: The global unique identification of the service acknowledged herewith;
Management VLAN: The unique network VLAN identification for administration, operation, and management communication; and
Data VLAN: The unique network VLAN identification for content data communication.

In step 8C, the content system 150 transmits, to the orchestration node 710, a service configuration message containing at least the following information:

Service Catalog: Information about the free and fee-based content services available from the content system 150;
Service Config: Information about service name, description, URL, price; and
QoS Parameters: Information about the quality-of-service level (e.g., bandwidth, latency) required to be provided by the wireless network 330 to support the streaming of content from the content system 150 to UEs.

In response, in step 8D, the orchestration node 710 transmits, to the content system 150, an ACK containing at least the following information:

Service Parameters: Information service name, QoS parameters; and

Routing Policies: Information about protocol, source and destination IP addresses, source and destination ports, traffic type, access list, packet size.

After completing steps 8A-8D of FIG. 8, a service agreement is established between Content Provider Y and Network Provider W.

Figure 9:
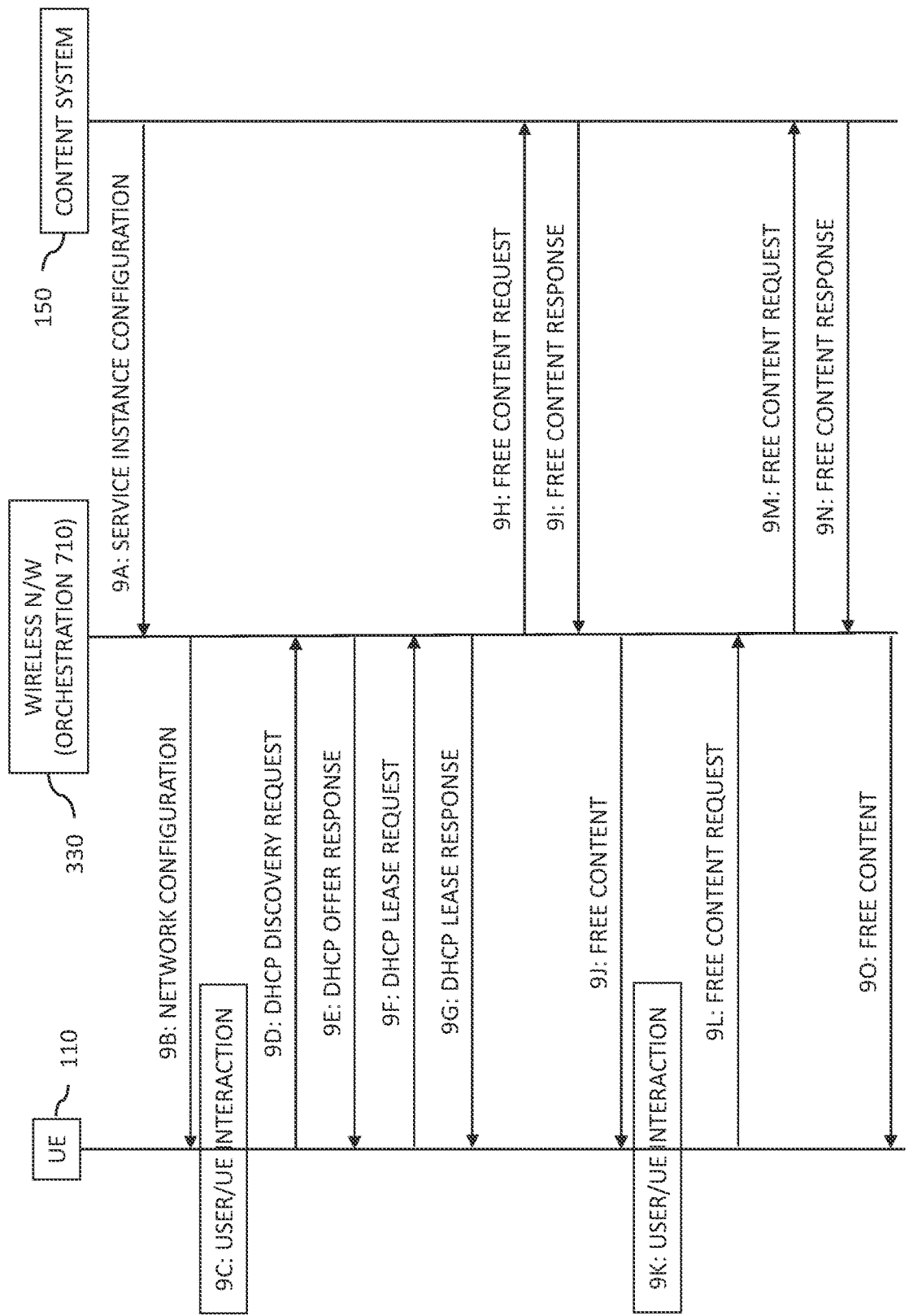
FIG. 9 is a message-flow diagram representing the processing within the configuration 300 of FIGS. 3, 5, and 7 by which a user who is not a subscriber to Network Provider W's wireless network service is able to use their unauthenticated UE to establish a limited wireless network connection with Network Provider W's wireless network to receive content from Content Provider Y's content system according to certain implementations of the disclosure.
Figure 9:
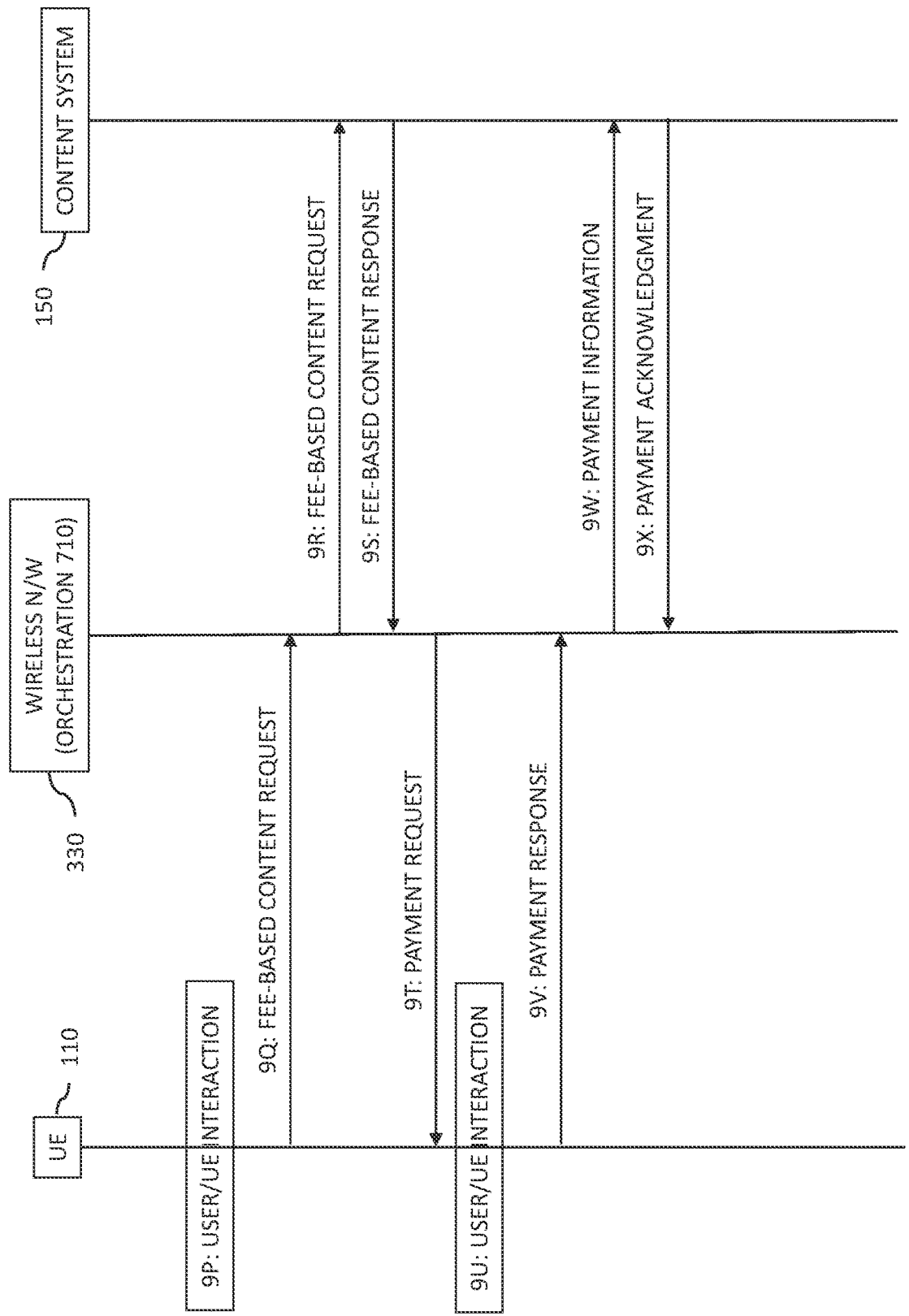

FIG. 9 is a message-flow diagram representing the processing within the configuration 300 of FIGS. 3, 5, and 7 by which a user who is not a subscriber to Network Provider W's wireless network service is able to use their unauthenticated UE 110 to establish a limited wireless network connection with Network Provider W's wireless network 330 to receive content from Content Provider Y's content system 150 according to certain implementations of the disclosure.

Note that, in the messaging described below for FIG. 9, it will be understood that broadcast messages identify the sender of the message, while unicast (i.e., point-to-point) messages identify both the sender and the intended recipient of the message. Unless explicitly identified as a broadcast message, each message described below should be understood to be a unicast message.

In step 9A of FIG. 9, the content system 150 transmits, to the orchestration node 710 of the wireless network 330, a service instance configuration message by which the content system 150 instructs the orchestration node 710 to be configured to support an instance of the services covered by the service agreement established by the process of FIG. 8. The service instance configuration message 9A includes at least the following information:

Service Name: The unique identification of the content provider service offered to a customer;

Start Time: The date and time of the beginning of the content service instance;

End Time: The date and time of the termination of the content service instance;

Geographic Location: The physical location of the coverage area of the content service instance (e.g., in a polygon representation of the topology);

Service Description: Description of the content services available from the content system 150 for the content service instance;

Server IP Address: The IP address of the content system 150 for the content service instance;

HTTP Link Address: The HTTP address of the link 340 between the content system 150 and the wireless network 330 for the content service instance;

Access Credential: The authentication and cryptographic key to be used between the unauthenticated UE 110 and the content system 150; and Quality of Service: The quality of service (e.g., bandwidth, latency) that the wireless network 330 should provide to unauthenticated UEs for the content service instance.

After configuring the wireless network 330 for the content service instance, the orchestration node 330 begins transmitting periodic broadcast messages that contain network configuration information for the content services that are available from the content system 150 to unauthenticated UEs. Step 9B represents the transmission from the wireless network 330 to the unauthenticated UE 110 of one such broadcast message containing at least the following information:

Network Name: The identity of the wireless network 330;

Management VLAN: The unique network VLAN identification for administration, operation, and management communication;

Network Access: Human-readable information about how to access the wireless network 330;

Content Access: Human-readable information about how to access content from the content system 150;

Network Selection: Human-readable information about how to select the wireless network 330 from the available network list;

Network Credentials: The authentication and cryptographic key to be used between the unauthenticated UE 110 and the wireless network 330; and Content Service Selection: Human-readable information about how to select the service from the available service list.

In order to be able to take advantage of the content services offered by the content system 150 via the wireless network 330, the UE 110 must run the client app 112 of FIG. 5, which extracts and processes the network configuration information from the broadcast network configuration message 9B, even though the UE 110 is not authenticated by the wireless network 330. This processing is represented by step 9C, in which the UE 110 displays information to the user about the availability of limited network access with the wireless network 330 to receive content from the content system 150 and, in response, the user chooses to establish that limited network connection with the wireless network 330.

In response to the user's selection in step 9C, the UE 110 initiates a sequence of Dynamic Host Configuration Protocol (DHCP) messaging with the orchestration node 710 (i.e., steps 9D-9G described further below) to establish the limited network connection with the wireless network 330 that corresponds to the management VLAN 720 of FIG. 7, which includes the UE 110, the orchestration node 710, and, depending on the particular implementation, possibly the content system 150.

Because the user is not a subscriber to the wireless network services of Network Provider W (and because the user's network provider (i.e., Network Provider X of FIG. 1) does not have a roaming agreement with Network Provider W), the UE 110 is not authenticated by Network Provider W's wireless network 330. As such, conventional portions of the 5G core 334 of the wireless network 330 (e.g., Access and Mobility Management Function (AMF) 740, User Plane Function (UPF) 760, Session Management Function (SMF) 770) are configured to ignore conventional messages from unauthenticated UEs. In order to bypass that filtering by those nodes, the UE 110 communicates with the orchestration node 710 using encapsulated DHCP messages that tunnel through the rest of the 5GC 334. In some implementations, a Generic Routing Encapsulation (GRE) tunnel is used. In other implementations, a Point-to-Point Protocol over Ethernet (PPPoE) tunnel may be used. Other suitable types of tunnels may be used in other implementations.

The orchestration node 710 runs a DHCP server (not shown in the figures) that receives and responds to encapsulated DHCP messages from the unauthenticated UE 110. The UE 110 is still an unauthenticated device, but is allowed to be connected with the wireless network 330 for only limited content service access. Messages to pre-defined network addresses (e.g., DHCP server, content service portal, Authentication Authorization Accounting (AAA)) are allowed. Any messages with other destination addresses will be dropped. In some embodiments, this can be implemented with "iptables" commands. The DHCP server is preferably implemented as a container (docker container as a virtualized function module) in the orchestration node 710.

Referring again to FIG. 9, steps 9D-9G represent DHCP messaging by which the orchestration node 710 establishes the management VLAN 720 of FIG. 7 with the unauthenticated UE 110. Note that each different unauthenticated UE that establishes a limited network connection with the wireless network 330 will be assigned to its own unique management VLAN with the orchestration node 710.

In particular, in response to the user selecting the wireless network 330 in step 9C, in step 9D, the unauthenticated UE 110 transmits an encapsulated, broadcast DHCP discovery request to locate the DHCP server implemented by the orchestration node 710 of the wireless network 330. The DHCP discovery request 9D contains at least the following information:

UE Ethernet Information: Identifies Medium Access Control (MAC) address of the UE 110;
UE IP Information: Identifies Internet Protocol (IP) address of the UE 110; and
DHCP Payload: Identifies the message as a DHCP discovery request.

In response, in step 9E, the orchestration node 710 transmits, to the UE 110, an encapsulated DHCP offer response identifying the orchestration node 710 as having the DHCP server and offering the network connection to the UE 110, where the DHCP offer response 9E contains at least the following information:

Orchestration Node Ethernet Information: Identifies MAC address of the orchestration node 710;
Orchestration Node IP Information: Identifies IP address of the orchestration node 710; and
DHCP Payload: Identifies the message as a DHCP offer response.

In response, in step 9F, the UE 110 transmits, to the orchestration node 710, an encapsulated DHCP lease request to inform the orchestration node 710 that the UE 110 wants to establish a management VLAN to access free content from the content system 150. The DHCP lease request 9F contains at least the following information:

UE Ethernet Information: Identifies MAC address of the UE 110;
UE IP Information: Identifies IP address of the UE 110; and
DHCP Payload: Identifies the message as a DHCP lease request.

In response, in step 9G, the orchestration node 710 transmits, to the UE 110, an encapsulated DHCP lease response acknowledging receipt of the DHCP lease request 9E and confirming the establishment of the management VLAN 720. The DHCP lease response 9G contains at least the following information:

Orchestration Node Ethernet Information: Identifies MAC address of the orchestration node 710;
Orchestration Node IP Information: Identifies IP address of the orchestration node 710; and
DHCP Payload: Identifies the message as a DHCP lease response.

At this point in the processing of FIG. 9, the unauthenticated UE 110 has established limited network access with the wireless network 330 in the form of the management VLAN 720 with the orchestration node 710 such that the unauthenticated UE 110 may begin to receive free content from the content system 150.

In the particular implementation represent in FIG. 9, free content is transmitted from the content system 150 to the orchestration node 710 during on-line processing (as opposed to other implementations in which the content system 150 transmits free content to the orchestration node 710 ahead of time during off-line processing). As such, in response to the establishment of the management VLAN 720, in step 9H, the orchestration node 710 transmits, to the content system 150 via either the management VLAN 720 or the dedicated VLAN 750, depending on the particular implementation, a "free content" request asking the content system 150 to transmit free content to the orchestration node 710. The "free content" request 9H contains at least the following information:

UE ID: Identifies the UE 110;
UE IP Address: Identifies IP address of the UE 110;
Management VLAN: Identifies the management VLAN 720; and
Service Name: Identifies the requested free content.

In response, in step 9I, the content system 150 transmits, to the orchestration node 710, the requested free content in one or more response messages, and, in step 9J, the orchestration node 710 transmits, to the UE 110 via the management VLAN 720, the free content in one or more encapsulated messages. At this point, the free content may be Content Provider Y's homepage indicating content services that are available to the user.

In this particular scenario, the user requests one or more additional sets of free content (e.g., other web pages of Content Provider Y, movie trailers, etc.). In particular, in step 9K, the UE 110 renders the current set of free content received from the orchestration node 710 on the UE's display and/or loudspeaker, and the user selects a next set of free content.

In response, in step 9L, the UE 110 transmits, to the orchestration node 710, a corresponding encapsulated free content request containing at least the following information:

The client application 112 authentication information and the UE identification; and
The information about IP address of content system 150, content system unique content identification.

In response, in step 9M, the orchestration node 710 transmits, to the content system 150, a corresponding free content request containing at least the following information:

The client application 112 authentication information and the UE identification; and
The information about the IP address of the content system 150, content system unique content identification.

In response, in step 9N, the content system 150 transmits, to the orchestration node 710, the requested free content in one or more response messages, and, in step 9O, the orchestration node 710 transmits, to the UE 110 via the management VLAN 720, the free content in one or more encapsulated messages.

The processing of steps 9K-9O is implemented one or more times depending on how many sets of free content the user requests.

Eventually, in step 9P, the user selects a set of fee-based content (e.g., a movie). In response, in step 9Q, the UE 110 transmits, to the orchestration node 710, an encapsulated request for the fee-based content containing at least the following information:

The client application 112 authentication information and the UE identification; and The information about IP address of content system 150, content system unique content identification.

In response, in step 9R, the orchestration node 710 transmits, to the content system 150, a corresponding fee-based content request containing at least the following information:

UE Identification: The MAC address of the UE 110;
Content ID: The identification of the selected fee-based content;
Client application 112 authentication information; and
IP address of content system 150.

The content system 150 maintains a database of all users who are existing subscribers to the content services of Content Provider Y, where the database links each subscribing user to the MAC address of the user's UE. If the content system 150 determines that the user of the UE 110 has a subscription with Content Provider Y that covers the specific fee-based content requested by the user, then, in step 9S, the content system 150 transmits, to the orchestration node 710, a fee-based content response indicating that the user is authorized to receive the selected fee-based content. In that case, processing skips steps 9T-9X and proceeds directly to step 9Y as described further below.

If the content system 150 determines that the user of the UE 110 does not have a subscription with Content Provider Y that covers the specific fee-based content requested by the user, then, in step 9S, the content system 150 transmits, to the orchestration node 710, a fee-based content response indicating that the user needs to provide payment information before being authorized to receive the selected fee-based content. In that case, in step 9T, the orchestration node 710 transmits, to the UE 110, an encapsulated message requesting payment by the user.

In response, in step 9U, the UE 110 renders the payment request on the UE's display and/or loudspeaker, and the user responds by entering appropriate payment information (e.g., credit card number, etc.) into the UE 110. In response, in step 9V, the UE 110 transmits, to the orchestration node 710, an encapsulated payment response message containing the entered payment information, and, in step 9W, the orchestration node 710 transmits that payment information to the content system 150. In response, the content system 150 transmits, to the orchestration node 710, a payment ACK indicating whether the payment has been approved. Note that, depending on the implementation, the payment processing of steps 9S-9X may involve additional conventional messaging not shown in FIG. 9.

At this point in the process of FIG. 9, all of the messaging between the UE 110 and the orchestration node 710 starting at step 9J through step 9V has been encapsulated messaging via the management VLAN 720. At this point, assuming that either (i) the user's content service subscription with Content Provider Y covers the selected fee-based content or (ii) the content system 150 has approved of the user's payment for the selected fee-based content, the orchestration node 710 is ready to move the UE 110 from the existing management VLAN 720 to the to-be-established data VLAN 730. This process begins, in step 9Y, with the orchestration node 710 transmitting, to the UE 110 via the management VLAN 720, an encapsulated network restart message instructing the UE 110 to re-start the DHCP discovery process in order to establish the data VLAN 730. The network restart message 9Y contains at least the following information:

Network Data: Information about the wireless network 330, the data VLAN 730, the orchestration node 710, the content system 150, and Subnet address; and
Service Name: Identifies the requested fee-based content service.

In response, the UE 110 initiates a DHCP discovery process to establish the data VLAN 730, where the messaging of steps 9Z-9CC is analogous to the messaging of steps 9D-9G that established the management VLAN 720. At the completion of step 9CC, the unauthenticated UE 110 will have re-established limited network access with the wireless network 330 in the form of the data VLAN 730 with the orchestration node 710 and the content system 150 such that the unauthenticated UE 110 may begin to receive the selected fee-based content from the content system 150. Note that, like the management VLAN 720, the data VLAN 730 is unique to the UE 110 with other UEs possibly having their own unique data VLANs with the orchestration node 710 and the content system 150.

As such, in step 9DD, the orchestration node 710 transmits, to the content system 150, a fee-based content service request instructing the content system 150 to join the data VLAN in order to provide the selected fee-based content to the UE 110. The fee-based content service request 9DD contains at least the following information:

UE ID: MAC address of the UE 110;
UE IP Address: IP address of the UE 110;
Data VLAN: Identification of the data VLAN 730; and
Service Name: Identifies the requested fee-based content service.

In response, in step 9EE, the content system 150 transmits, to the orchestration node 710, a content service response providing configuration information to the orchestration node 710 for the selected fee-based content. The content service response 9EE contains at least the following information:

UE ID: Identity of the UE 110;
Service Name: Identifies the requested fee-based content service;
Transaction ID: A content system 150 unique identification for the execution of content streaming;
Start Time: Time of the beginning of the streaming of the selected fee-based content;
End Time: Time of the end of the streaming of the selected fee-based content;
Content System ID: Identify of the content system 150;
Server IP: IP address of the content system 150;
Access Credential: The authentication and cryptographic key to be used between the unauthenticated UE 110 and the content system 150; and
QoS parameters: Quality-of-service levels for the selected fee-based content.

In response, in step 9FF, the orchestration node 710 transmits, to the content system 150, a content service ACK informing the content system 150 that streaming of the selected fee-based content can begin. The content service ACK 9FF contains at least the following information:

Transaction ID: Identification of this instance of content streaming;
UE ID: Identity of the UE 110; and
User Plane Function ID: Identification of the path through the wireless network 330 for this instance of content streaming.

In response, in step 9GG, the content system 150 streams, to the UE 110 via the data VLAN 730, the selected fee-based content in one or more messages that do not have to be encapsulated. In certain implementations, the content is streamed from the content system 150 to the UE 110 via the link 790, the DN node 795, the UPF node 760, and the RAN 332 of FIG. 7 without involving other nodes of the wireless network 330. Each fee-based content message 9GG contains at least the following information:

Content System IP: The IP address of the content system 150;
UE IP: The IP address of the UE 110;
Content System Port: The port number of the content streaming at the content application 156;
UE Port: The port number of the content streaming at the client application 112;
Data Length: The amount of data in the message 9GG; and
Data: The content data contained in the message 9GG.

In some implementations, one or more of the following characteristics apply to the limited communications between the UE 110 and the content system 150 via the wireless network 330:

Privacy protection for the Subscription Permanent Identifier (SUPI) is not required;
Network Integrity Algorithm NIA-0 is not disabled in the Access and Mobility Management Function (AMF);
The UE is in limited service mode (LSM) due to not being authenticated by the AMF/SEAF (Security Anchor Function);
The UE is allowed to establish a service portal session only by sending a portal registration request message;
The AMF is able to configure when the unauthenticated UE in LSM is able to establish a service portal session by device id and subscriber-id (e.g., Medium Access Control (MAC) address and International Mobile Subscriber Identity (IMSI)) in the grant or blocking list;
The AMF selects NIA-0 and Network Encryption Algorithm NEA-0. The AMF sets the UE 5G security capability to only contain EPS (Evolved Packet System) Integrity Algorithm EIA-0, EPS Encryption Algorithm EEA-0, NIA-0 and NEA-0 when sending 5G messages (Next Generation Application Protocol (NGAP) UE Initial Context Setup, NGAP UE Context Modification Request, NGAP Handover Request) to the Radio Access Network (RAN);
5G RAN selects only a null integrity protection for Application Server (AS) integrity protection and a null ciphering algorithm for AS confidentiality protection; and/or
The UE generates a Subscription Concealed Identifier (SUCI) using "null-scheme" only in the initial step for an unauthenticated service portal session. The UE does not have a 5G-GUTI (Global Unique Temporary Identifier) to the chosen Public Land Mobile Network (PLMN).

In certain embodiments, the present disclosure is a wireless network of a first network provider, the wireless network comprising a radio access network (RAN) connected to a network core comprising an orchestration node. The RAN is configured to support wireless communications with wireless devices, and the orchestration node is configured to support communications with a content system of a content provider having a service agreement with the first network provider such that the orchestration node is configured to (i) receive content from the content system and (ii) transmit the content via the RAN to an unauthenticated wireless device of a user who is a subscriber of a second network provider that does not have a roaming agreement with the first network provider.

In at least some of the above embodiments, the orchestration node is configured to (a) establish a management virtual local area network (VLAN) with the unauthenticated wireless device to (i) provide, to the unauthenticated wireless device, free content received from the content system, (ii) receive a selection of fee-based content from the unauthenticated wireless device, and (iii) move the unauthenticated wireless device from the management VLAN to a data VLAN with the content system and (b) enable streaming of the fee-based content from the content system to the unauthenticated wireless device within the data VLAN.

In at least some of the above embodiments, the orchestration node is configured to receive identity of the unauthenticated wireless device; communicate with the content system to determine whether the user is a subscriber of the content provider; and, if not, then coordinate payment by the user for the fee-based content.

In at least some of the above embodiments, the orchestration node is configured to establish a network connection the unauthenticated wireless device using encapsulated messages transmitted via a logical tunnel that bypasses other nodes of the network core that would otherwise prevent the network connection with the unauthenticated wireless device.

In certain embodiments, the present disclosure is a content system of a content provider, the content system comprising a processor and a memory storing program code, such that, when the processor executes the program code, the content system is configured to (i) establish communications with a wireless network under a service agreement between the content provider and a first network provider of the wireless network and (ii) transmit content via the wireless network to an unauthenticated wireless device of a user who is a subscriber of a second network provider that does not have a roaming agreement with the first network provider.

In at least some of the above embodiments, the content system is configured to transmit free content to the unauthenticated wireless device via the wireless network within a management VLAN; receive from the wireless network a selection of fee-based content from the user; and stream the fee-based content to the unauthenticated wireless device via the wireless network within a data VLAN.

In at least some of the above embodiments, the content system is configured to receive identity of the unauthenticated wireless device from the wireless network; determine whether the user is a subscriber of the content provider; and, if not, then communicate with the wireless network to coordinate payment for the fee-based content selected by the user.

In certain embodiments, the present disclosure is a wireless device of a user, the wireless device comprising a processor and a memory storing program code, such that, when the processor executes the program code, the wireless device is configured to (i) communicate as an unauthenticated wireless device with a wireless network of a first network provider, wherein the user is a subscriber of a second network provider that does not have a roaming agreement with the first network provider, and (ii) receive content via the wireless network from a content system of a content provider having a service agreement with the first network provider.

In at least some of the above embodiments, the unauthenticated wireless device is configured to (a) establish a management VLAN with the wireless network to (i) receive free content from the content system via the wireless network, (ii) transmit a selection of fee-based content to the wireless network, and (iii) be moved by the wireless network from the management VLAN to a data VLAN with the content system and (b) receive streaming of the fee-based content from the content system via the wireless network within the data VLAN.

In at least some of the above embodiments, the unauthenticated wireless device is configured to (i) transmit identity of the unauthenticated wireless device to the wireless network and (ii) if the user is not a subscriber of the content provider, then coordinate payment by the user for the fee-based content.

In at least some of the above embodiments, the unauthenticated wireless device is configured to establish a network connection with the wireless network using encapsulated messages transmitted via a logical tunnel that bypasses nodes of the wireless network that would otherwise prevent the network connection with the unauthenticated wireless device.

Although not explicitly shown in the figures, each node in the figures has at least one processor (e.g., a programmable CPU) for processing incoming and/or outgoing data, memory (e.g., RAM, ROM) for storing data and (in some implementations) program code to be executed by the processor, and communication hardware (e.g., transceivers) for communicating with one or more other nodes.

Embodiments of the disclosure may be implemented as (analog, digital, or a hybrid of both analog and digital) circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing blocks in a software program. Such software may be employed in, for example, a digital signal processor, micro-controller, general-purpose computer, or other processor.

As used herein in reference to an element and a standard, the terms "compatible" and "conform" mean that the element communicates with other elements in a manner wholly or partially specified by the standard, and would be recognized by other elements as sufficiently capable of communicating with the other elements in the manner specified by the standard. A compatible or conforming element does not need to operate internally in a manner specified by the standard.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system."

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, when the program code is loaded into and executed by a machine, such as a computer, the machine becomes an apparatus for practicing the disclosure. When implemented on a general-purpose processor, the program code segments combine with the processor to provide a unique device that operates analogously to specific logic circuits.

Any suitable processor-usable/readable or computer-usable/readable storage medium may be utilized. The storage medium may be (without limitation) an electronic, magnetic, optical, electromagnetic, infrared, or semiconductor system, apparatus, or device. A more-specific, non-exhaustive list of possible storage media include a magnetic tape, a portable computer diskette, a hard disk, a random access memory (RAM), a read-only memory (ROM), an erasable programmable read-only memory (EPROM) or Flash memory, a portable compact disc read-only memory (CD-ROM), an optical storage device, and a magnetic storage device. Note that the storage medium could even be paper or another suitable medium upon which the program is printed, since the program can be electronically captured via, for instance, optical scanning of the printing, then compiled, interpreted, or otherwise processed in a suitable manner including but not limited to optical character recognition, if necessary, and then stored in a processor or computer memory. In the context of this disclosure, a suitable storage medium may be any medium that can contain or store a program for use by or in connection with an instruction execution system, apparatus, or device.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain embodiments of this disclosure may be made by those skilled in the art without departing from embodiments of the disclosure encompassed by the following claims.

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the disclosure.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

All documents mentioned herein are hereby incorporated by reference in their entirety or alternatively to provide the disclosure for which they were specifically relied upon.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A wireless network of a first network provider, the wireless network comprising a radio access network (RAN) connected to a network core comprising an orchestration node, wherein:

the RAN is configured to support wireless communications with wireless devices; and the orchestration node is configured to support communications with a content system of a content provider such that:

the orchestration node is configured to (i) receive content from the content system and transmit the content via the RAN to an unauthenticated wireless device of a user who is a subscriber of a second network provider, wherein the orchestration node is configured to:

establish a management virtual local area network (VLAN) with the unauthenticated wireless device to (i) provide, to the unauthenticated wireless device, free content received from the content system, (ii) receive a selection of fee-based content from the unauthenticated wireless device, and (iii) move the unauthenticated wireless device from the management VLAN to a data VLAN with the content system, wherein the data VLAN is different from the management VLAN; and enable streaming of the fee-based content from the content system to the unauthenticated wireless device within the data VLAN.

2. The wireless network of claim 1, wherein the orchestration node is configured to:

receive identity of the unauthenticated wireless device;

communicate with the content system to determine whether the user is a subscriber of the content provider; and coordinate payment by the user for the fee-based content, upon determining that the user is not a subscriber of the content provider.

3. The wireless network of claim 1, wherein the orchestration node is configured to establish a network connection the unauthenticated wireless device using encapsulated messages transmitted via a logical tunnel that bypasses other nodes of the network core that would otherwise prevent the network connection with the unauthenticated wireless device.

4. A method for transmitting content in a wireless network of a first network provider, the wireless network comprising a RAN connected to a network core comprising an orchestration node, wherein:
the RAN supports wireless communications with wireless devices; and
the orchestration node supports communications with a content system of a content provider such that:
the orchestration node (i) receives content from the content system and (ii) transmits the content via the RAN to an unauthenticated wireless device of a user who is a subscriber of a second network provider, wherein the orchestration node:
establishes a management VLAN with the unauthenticated wireless device to (i) provide, to the unauthenticated wireless device, free content received from the content system, (ii) receive a selection of fee-based content from the unauthenticated wireless device, and (iii) move the unauthenticated wireless device from the management VLAN to a data VLAN with the content system, wherein the data VLAN is different from the management VLAN; and
enables streaming of the fee-based content from the content system to the unauthenticated wireless device within the data VLAN.

5. The method of claim 4, wherein the orchestration node:
receives identity of the unauthenticated wireless device;
communicates with the content system to determine whether the user is a subscriber of the content provider; and
coordinates payment by the user for the fee-based content, upon determining that the user is not a subscriber of the content provider.

6. The method of claim 4, wherein the orchestration node establishes a network connection the unauthenticated wireless device using encapsulated messages transmitted via a logical tunnel that bypasses other nodes of the network core that would otherwise prevent the network connection with the unauthenticated wireless device.

7. A content system of a content provider, the content system comprising a processor and a memory storing program code, such that, upon the processor executing the program code, the content system is configured to:
establish communications with a wireless network of a first network provider; and
transmit content via the wireless network to an unauthenticated wireless device of a user who is a subscriber of a second network provider, wherein the content system is configured to:
transmit free content to the unauthenticated wireless device via the wireless network within a management VLAN;
receive from the wireless network a selection of fee-based content from the user; and
stream the fee-based content to the unauthenticated wireless device via the wireless network within a data VLAN different from the management VLAN.

8. The content system of claim 7, wherein the content system is configured to:
receive identity of the unauthenticated wireless device from the wireless network;
determine whether the user is a subscriber of the content provider; and
communicate with the wireless network to coordinate payment for the fee-based content selected by the user, upon determining that the user is not a subscriber of the content provider.

9. A method for transmitting content from a content system of a content provider, the method comprising the content system:
establishing communications with a wireless network of a first network provider of the wireless network; and
transmitting content via the wireless network to an unauthenticated wireless device of a user who is a subscriber of a second network provider, wherein the content system:
transmits free content to the unauthenticated wireless device via the wireless network within a management VLAN;
receives from the wireless network a selection of fee-based content from the user; and
streams the fee-based content to the unauthenticated wireless device via the wireless network within a data VLAN different from the management VLAN.

10. The method of claim 9, wherein the content system:
receives identity of the unauthenticated wireless device from the wireless network;
determines whether the user is a subscriber of the content provider; and
communicates with the wireless network to coordinate payment for the fee-based content selected by the user, upon determining that the user is not a subscriber of the content provider.

11. A wireless device of a user, the wireless device comprising a processor and a memory storing program code, such that, upon the processor executing the program code, the wireless device is configured to:
communicate as an unauthenticated wireless device with a wireless network of a first network provider, wherein the user is a subscriber of a second network provider; and
receive content via the wireless network from a content system of a content provider, wherein the unauthenticated wireless device is configured to:
establish a management VLAN with the wireless network to (i) receive free content from the content system via the wireless network, (ii) transmit a selection of fee-based content to the wireless network, and (iii) be moved by the wireless network from the management VLAN to a data VLAN with the content system, wherein the data VLAN is different from the management VLAN; and
receive streaming of the fee-based content from the content system via the wireless network within the data VLAN.

12. The wireless device of claim 11, wherein the unauthenticated wireless device is configured to:
transmit identity of the unauthenticated wireless device to the wireless network; and
coordinate payment by the user for the fee-based content, upon determining that the user is not a subscriber of the content provider.

13. The wireless device of claim 11, wherein the unauthenticated wireless device is configured to establish a network connection with the wireless network using encapsulated messages transmitted via a logical tunnel that bypasses nodes of the wireless network that would otherwise prevent the network connection with the unauthenticated wireless device.

14. A method for receiving content at a wireless device of a user, the method comprising the wireless device:

communicating as an unauthenticated wireless device with a wireless network of a first network provider, wherein the user is a subscriber of a second network; and receiving content via the wireless network from a content system of a content provider, wherein the unauthenticated wireless device:

establishes a management VLAN with the wireless network to (i) receive free content from the content system via the wireless network, (ii) transmit a selection of fee-based content to the wireless network, and (iii) be moved by the wireless network from the management VLAN to a data VLAN with the content system, wherein the data VLAN is different from the management VLAN; and receives streaming of the fee-based content from the content system via the wireless network within the data VLAN.

15. The method of claim 14, wherein the unauthenticated wireless device:

transmits identity of the unauthenticated wireless device to the wireless network; and coordinates payment by the user for the fee-based content, upon determining that the user is not a subscriber of the content provider.

16. The method of claim 14, wherein the unauthenticated wireless device establishes a network connection with the wireless network using encapsulated messages transmitted via a logical tunnel that bypasses nodes of the wireless network that would otherwise prevent the network connection with the unauthenticated wireless device.

* * * * *